Nov. 3, 1925.
H. T. MEADER
1,559,725
TRANSMISSION CONTROL ATTACHMENT
Filed Feb. 7, 1925
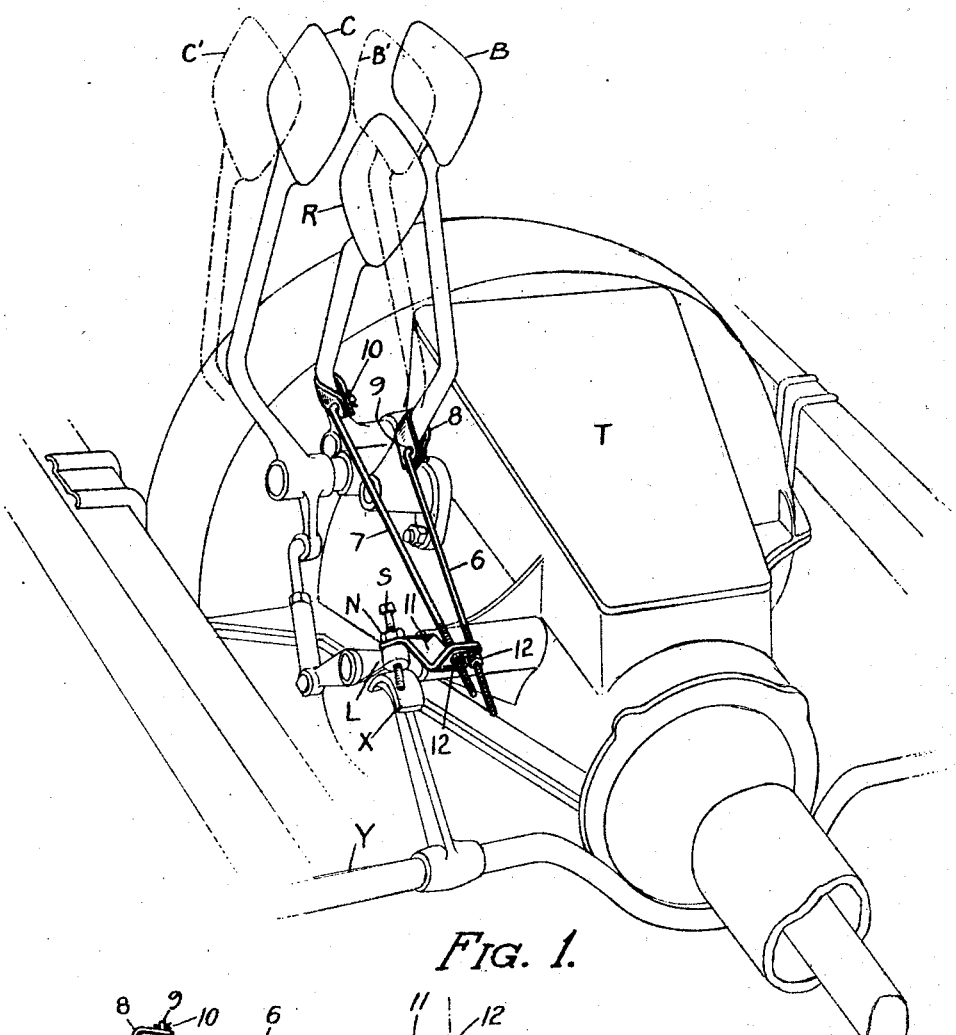
FIG. 1.
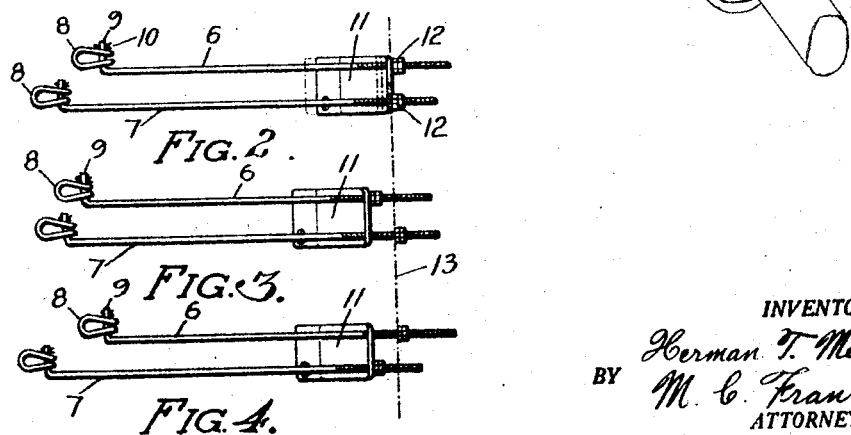
FIG. 2.
FIG. 3.
FIG. 4.
INVENTOR.
Herman T. Meader
BY M. C. Frank
ATTORNEY.

Patented Nov. 3, 1925.

1,559,725

UNITED STATES PATENT OFFICE.

HERMAN T. MEADER, OF OAKLAND, CALIFORNIA.

TRANSMISSION-CONTROL ATTACHMENT.

Application filed February 7, 1925. Serial No. 7,653.

*To all whom it may concern:*

Be it known that I, HERMAN T. MEADER, a citizen of the United States, residing at Oakland, in the county of Alameda and State of California, have invented certain new and useful Improvements in Transmission-Control Attachments, of which the following is a specification.

My invention relates to transmission control attachments, and more particularly to clutch release devices for automobiles of the Ford type as an auxiliary or accessory thereto.

One learning to drive an automobile having a transmission of the Ford type, usually has difficulty in manipulating the control pedals thereof with respect to the engagement and releasement of the clutch. This difficulty results in confusion with jerks and sudden stops of the car and consequent undue wear and tear of the brakes, transmission mechanism and car in general. Even after one has learned to drive, he must ever be on the alert to properly manipulate the clutch pedal in conjunction with the brake and reverse pedals respectively.

When traveling in high gear and it is desired to bring the car to a stop, the present practice is that the clutch pedal and brake pedal must be simultaneously depressed. This action necessitates the use of both feet, one foot for the brake and the other to push and hold the clutch pedal in neutral position. Also when it is desired to reverse the car, one foot must be used to depress the reverse pedal and the other to hold the clutch pedal in neutral position, again necessitating that both feet be used. If both pedals are not depressed the aims of the driver are not attained, and results disastrous to the transmission mechanism or car frequently occur.

I consider the above mentioned facts deficiencies in the art and seek to overcome them by an improvement to be added to the art, hence, the main object of my invention is the provision of an extremely simple, durable and inexpensive device adapted to be easily attached to the transmission control such as installed in a Ford car chiefly.

Other objects are to eliminate the difficulties one experiences in learning to drive, to make driving extremely easy at all times, to disengage the clutch by operating the brake pedal alone, to disengage the clutch by operating the reverse pedal alone, and to disengage the clutch by operating both the brake and reverse pedals simultaneously as one might do by error.

Other objects and advantages and the features of construction of the invention, will appear in the subjoined description of the accompanying sheet of drawings, in which:

Figure 1 is a perspective view, in light lines, of the transmission control of a Ford car having my invention applied thereto and which is shown in heavy lines. The position of the pedals shown in full lines indicates that the clutch is in high gear.

Fig. 2 is a plan of my invention per se. The parts are in the same position for operation as shown in Fig. 1.

Fig. 3 is a view similar to Fig. 2, but showing the relative position the parts of the invention will assume when the brake pedal of Fig. 1 is depressed to its braking position as indicated in dot-and-dash lines in the latter figure; and Fig. 4 is likewise a view similar to Fig. 2, but showing the relative position the parts of the invention will assume when the reverse pedal is depressed to its reversing position.

I will now describe the various drawings of the invention in detail in connection with the transmission control of a Ford assembly, the latter being the chosen illustration for purposes of convenience and clarity.

Adverting to the drawings: The letter T represents in general the transmission assembly of a Ford car, and B the brake pedal, R the reverse pedal and C the clutch pedal thereof for controlling the movements of the car. L indicates the clutch lever and S its screw provided with lock nut N, and which unit combination functions according to the movement of the speed lever X attached to controller shaft Y operable by the driver in applying the hand lever (not shown).

Connected to and between a pair of the said pedals and the said clutch lever is my invention. It is shown clearly in heavy lines throughout the figures. In this instance the invention consists of a pair of rods 6 and 7. Rod 6 is attached to the brake pedal B at its lower end by means of a clip 8 slipped thereover, and which clip has terminal holes for loosely receiving the bent over end 9 of the said rod. The said end is prevented from slipping out of the clip by means of a cotter pin 10. Rod 7 is similar to rod 6 and is fastened to the lower end of the reverse pedal R in a manner similar to that of rod 6. These connections are not rigid but are loose and more or less pivotal for free and easy action in service.

The opposite ends of the said rods are supported in a member in the nature of a stiff plate 11, suitably bent or formed near each end so that the bends are opposite to each other and in planes virtually parallel with the clutch lever shaft for efficient co-action with the said rods and is rigidly connected at one end to the clutch lever by the latter's own screw S and lock nut N. At the end of the said plate opposite the said screw is a pair of holes of ample size to freely receive the rods 6 and 7. Fig. 2 shows a piece of the plate broken away at one of the holes. The free ends of the rods are threaded for a considerable length and each has a pair of nuts 12, the outside ones being lock nuts.

In operation, my invention functions as follows: When the car is at rest with the engine running and the hand brake set, the plate 11 will assume the position as shown in dot-and-dash lines Fig. 2 with respect to the rods 6 and 7, the end of the plate clearing the nuts 12. The driver may now start the car by engaging the clutch in low gear in the usual way; this movement of the clutch pedal C through its train of regular connections to the clutch lever L, causes the latter to rotate in a counterclockwise direction carrying its attached plate 11 still further away from the said nuts 12 of Fig. 2. The rods 6 and 7 being freely supported at opposed ends, act as links and accommodate themselves to freely permit the said plate to slide thereon and vice versa.

On releasing the foot from the clutch pedal C, the latter will automatically move to the opposite extreme position and engage the clutch in high gear. Figs. 1 and 2 show in heavy lines my invention as when the transmission control is engaged in high gear.

The depression of the brake pedal B in Fig. 1 to the dot-and-dash line position B', causes the clutch lever L to rotate and move the clutch pedal C to the neutral position C'. Fig. 3 shows that by this brake pedal movement, the rod 6 has drawn the plate 11 over the stationary rod 7 a distance from the imaginary base line 13. This base line may be considered the high gear line of Fig. 1.

Depressing the reverse pedal R to its reversing position, causes the clutch pedal C to again move to neutral position C'. This time the plate 11 is drawn forward by the rod 7 to accomplish the clutch releasement, the rod 6 remaining stationary; Fig. 4 illustrating this step.

At times a driver may become excited and confused and depress both the brake and reverse pedals simultaneously; this action simply throws the clutch pedal into neutral position C' and thereby releases the clutch from service and stops the car without any harm being done.

The brake bands of the car wear with usage so consequently the throw of the pedals will vary, and I have provided for this by threading the bolts 6 and 7 a long length as shown. By these threads and the nuts 12, a correct adjustment for pedal throw can be made separately for each pedal when desired, preferably using the high gear line 13 as a base for plate contact on both pair of nuts.

Drivers with large feet are constantly overlapping pedals with the present method of spaced equipment, and it is clear how such drivers will be greatly aided by my improvement as but one foot is necessary for any operation. Again, another great benefit resulting from my invention is, in making it possible for those who have but one leg to drive any car that has a transmission control similar to that as in the present car known as the "Ford."

In the drawings, I have shown an embodiment of my invention, but it is to be understood that the invention may be embodied in other forms, each being a species of my invention, and the patent protection that I desire, is all of that which comes within the spirit and scope of what I claim as new, and which claims are the following:

1. In a transmission-control attachment adapted for automobiles of the Ford type, (1) a clip adapted to be slipped over and loosely connected with the brake pedal or the reverse pedal, and said clip provided with terminal holes; (2) a rod for the clip having a bent end for entering the holes in the clip; (3) means for preventing the bent end of the rod from slipping out of the clip; (4) a stiff plate having at one end a hole adapted to receive therein the clutch lever's adjusting screw for rigid attachment of the plate to the clutch lever, the said plate provided with two bends opposite each other and in planes virtually parallel with the clutch lever shaft when the plate is attached, the first plate bend being near the hole for the adjusting screw, and the second bend being near the other end of the plate, there being in the plate between the second bend and the said other end a hole adapted to receive slidably therein the said rod; and (5) stop-and-lock means adjustably secured on the unbent end of the said rod, the arrangement being such that, with the stop-and-lock means properly adjusted on said rod, the depression of the pedal to which the said clip is attached will throw the clutch pedal into neutral position and thereby release the clutch from service.

2. In a transmission-control attachment adapted for automobiles of the Ford type, (1) two clips, one adapted to be slipped over and loosely connected with the brake pedal, and the other adapted to be slipped over and loosely connected with the reverse pedal, each clip being provided with terminal holes; (2) a rod for each clip, each rod having a bent end for entering the holes in the respective clip; (3) means for preventing the bent ends of the rods from slipping out of the clips; (4) a stiff plate having at one end a hole adapted to receive therein the clutch lever's adjusting screw for rigid attachment of the plate to the clutch lever, the plate being provided with two bends opposite to each other and in planes virtually parallel with the clutch lever shaft when the plate is attached, the first plate bend being near the hole for the adjusting screw, and the second bend being near the other end of the plate, there being in the plate between the second bend and said other end two holes, each adapted to receive slidably therein one of the respective rods; and (5) stop-and-lock means adjustably secured on the unbent ends of the rods, the arrangement being such that, with the stop-and-lock means properly adjusted on said rods, the depression of one or both of said pedals will throw the clutch pedal into neutral position and thereby release the clutch from service.

In testimony whereof I affix my signature.

HERMAN T. MEADER.